April 28, 1970 G. V. TAYLOR 3,508,696

TAPE BASKET

Filed Jan. 23, 1968

Inventor:
GEORGE V. TAYLOR
BY Eugene M. Whitacre
Attorney

United States Patent Office 3,508,696
Patented Apr. 28, 1970

3,508,696
TAPE BASKET

George V. Taylor, Indianapolis, Ind., assignor to RCA Corporation, a corporation of Delaware
Filed Jan. 23, 1968, Ser. No. 699,862
Int. Cl. G11b 23/12
U.S. Cl. 226—199 9 Claims

ABSTRACT OF THE DISCLOSURE

A basket for storing a magnetic tape includes a vertically extending upper portion into which the magnetic tape is received, an arcuately shaped intermediate portion, and a horizontally disposed lower portion from which the stored tape exits.

This invention relates to tape duplicating apparatus, and in particular to a tape basket means for handling an endless loop magnetic tape during a tape duplicating operation.

In a magnetic tape duplicating operation, a plurality of tape transports (slave units) are electrically synchronized to a master tape transport. The arrangement is such that information recorded on a tape which is passed through the master transport for scanning by transducers contained therein, is simultaneously fed to the slave units for recording in unison on virgin tape in each of the slave units. The prerecorded master tape may be in the form of an endless loop, the bulk of which is stored in serpentine folds in a vertically oriented basket prior to the tape being scanned by a transducer in the master transport. Inherent in the use of a vertically oriented basket storage apparatus are several drawbacks. For one, the weight of the tape, which is serpentinely stacked in layers upon itself, causes the exiting strand of tape to experience high drag and a jerkiness of motion. This motion is reflected as wow and flutter in the output signal from the master transport transducer fed to the slave units. In addition, magnetic tape tends to build and hold a static charge as it is being used. Thus, in known vertically oriented tape storage baskets, the close packing of the tape therein brings more and more tape strands into intimate contact which in turn causes them to cling tightly to each other due to static charge. This also introduces a jerking motion to the tape as the exiting strand is pulled free. Furthermore, close packing of the tape can cause permanent creases to form wherever the tape is folded. This can reduce tape life and also cause dropout, i.e., loss of signal, whenever a crease passes over a transducer head in the master transport.

It is an object of the present invention to provide an improved tape storage basket which is free of the aforementioned drawbacks.

The tape storage basket of the present invention includes a vertically extending upper storage portion, an arcuately shaped central storage portion and a horizontally disposed lower storage portion. The tape enters the basket through an opening in the upper storage portion and exits the basket through an opening in the lower storage portion.

Figure 1:
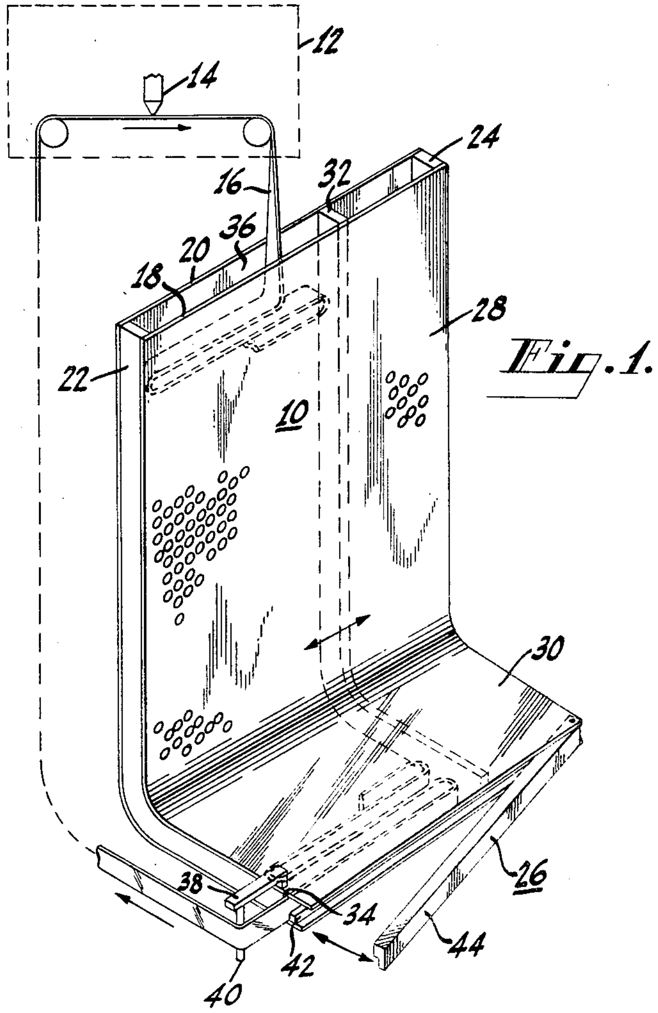
Figure 2:
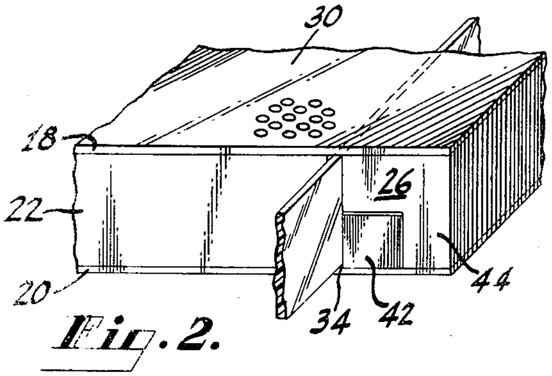

The novel features which are considered to be characteristic of the invention are set forth with particularity in the appended claims. The invention itself, however, both as to its organization and method of operation, as well as additional objects and advantages thereof, will best be understood from the following description when read in connection with the accompanying drawing in which:

FIGURE 1 is a pictorial view in diagrammatic form of a tape storage basket embodying the features of the present invention; and FIGURE 2 is an enlarged fragmentary view of the bottom end portion of the basket of FIGURE 1.

Referring now to the drawing, and in particular to FIGURE 1, the basket 10 of the invention is shown in co-operative association with a master transport, shown generally by the block 12, the transport having a transducer 14 arranged for scanning a traveling endless loop magnetic tape 16.

The basket 10 is in the form of a thin box-like framed enclosure having parallel front and back cover members 18 and 20 spaced apart by parallel side walls 22 and 24 and a bottom end wall 26. In FIGURE 1, a portion of the end wall 26 is shown in its open position so as to facilitate loading of the tape in the basket as will be hereinafter described. The end wall 26 is shown in its normally closed position in FIGURE 2. The central lengthwise portions of the front, back and side walls are arcuately shaped to provide an enclosure structure having a gradually curved transition from a vertically extending upper portion 28 to a horizontally disposed lower portion 30, the basket 10 thereby taking on a L shaped appearance.

A feature of the invention is the provision of an additional side wall member 32 positioned for lateral movement within the enclosure tape storage area and parallel to the side walls 22 and 24. The wall member 32 is mounted within the enclosure such that it can be moved back and forth, as indicated by the double arrows in FIGURE 1, along the length of the end wall 26, thereby to enable the width of the basket storage area to be adjusted to a desired dimension. In this manner the storage basket can be suitably used in conjunction with different lengths of tape, with the basket width being adjusted so that the stored tape substantially fills the lengthwise height of the basket.

In one of the side walls, as for example wall 22, in the basket lower portion adjacent the end wall 26, there is provided a tape exit opening 34. A tape entrance 36 is provided in the basket upper portion 28 at the end boundaries of the cover walls 18, and 20 and the side walls 22 and 24. While the basket 10 is shown as being completely open at its upper portion end boundary to define the tape entrance 36, it will be understood that the top end of the basket upper portion 28 could include an end wall having a central opening therein to receive the tape into the basket.

Affixed near the exit opening 34 and overhanging the side wall 22 is a bracket 38. A guide pin 40 depends from the overhanging portion of the bracket in alignment with the tape exit opening 34. Thus, tape issuing from the exit opening 34 may be directed around pin 40 and up towards the transport 12 for scanning by the transducer 14.

As shown more particularly in FIGURE 2, the end wall 26 in the basket lower portion 30 may itself, be comprised of two wall sections 42 and 44, one of which 44 is separable from the other and attached, as by a hinge 46 or other suitable means to the side wall 24. The separable nature of the wall section 44 provides a means of outside access to the lower portion 30 of the basket for threading the leading end of a received tape strand through the tape exit opening 34 as will be hereinafter described.

Preferably the basket of the invention is constructed of a non-magnetic material such as aluminum or stainless steel, with the front cover portion 18 being perforated as shown in the figures.

For use and operation, the basket is positioned relative to the tape transport so that a continuous tape feed available from the transport is directed downwardly into the basket entrance opening 36. Initial tape loading or storage in the basket may be accomplished as follows.

First, the basket width is adjusted in accordance with the length of the prerecorded tape to be stored in the basket so as to provide for a distribution of the tape in the vertical as well as curved and horizontal portions of the basket. This is accomplished by positioning the moveable wall member 32 at some suitable distance along the length of the end wall 26, as for example, the position in phantom view in the figure. The basket may then, if necessary, be repositioned relative to the transport tape feed so as to receive the tape vertically and without restriction within the opening bounded by the front and back walls 18 and 20, side wall 22 and the moveable side member 32.

Next, the vertical storage passage portion of the basket must be closed off from the rest of the basket so as to allow the received tape 16 to store only in the vertical portion 28 of the basket during the first phase of the loading operation. In the embodiment shown, blocking of the passage way may be accomplished by inserting the fingers of a rake-like device (not shown) through the perforated openings in the cover portion 18 so as to form a barrier or shelf within the basket passageway to support the serpentine turns of tape to be stacked thereabove. The purpose of blocking the passageway is to insure that during tape loading, the first portion of entering tape will not be influenced by any frictional contact with the curved walls in the central portion, and thereby disrupt the distribution of the serpentine folds of tape as it stacks for storage within the basket. Of course, other means of blocking the passageway may be used, as for example a moveable slide which can be inserted through a slot to be provided in the side walls of the basket.

Upon removal of the rake fingers from the perforated openings in the cover portion of the basket, the tape folds will then distribute themselves throughout the curved basket portion and the rest of the basket passageway. The bottom end of the basket may then be opened to allow entry into the passageway to allow for the retrival of the leading edge of the tape for threading through the exit opening in the side wall 22. From the exit opening 34, the leading end of the tape is directed around the guide pin 40 and up towards the transport to be spliced to the trailing end of the master tape roll. To complete the tape loading operation the remainder of the master tape roll is then caused to be fed through the entrance opening 36 and into the basket for storage therein with the trailing tape end being prevented from entering the basket by suitable means so as to allow it to be spliced to the leading end of the tape to form a continuous endless tape loop. Thus, during operation of the transport and basket, the major portion of a traveling endless loop magnetic tape will be stored in the basket enclosure.

The tape strands enter the enclosure through the opening 36 at the top of the basket. The continuous downward entry of the tape strands into the basket causes the strands to serpentine back and forth forming oppositely facing loops or folds within the basket cavity or passageway. The newly advancing loops or folds forces the previously stored loops or folds away from the basket upper region and down towards the curved central and horizontally disposed regions of the storage area. The shape and construction of the basket is such that the tape entering the basket in the curved region thereof develops a friction with the basket walls to almost prevent the tape from sliding down into the horizontal portion, thereby reducing the compressive force of additional layers of tape stored above. Due to the distribution of tape in the curved central portion of the basket, at the point of exit in the horizontally disposed basket portion, the exiting tape strand is relatively free of the weight and compressive forces of succeeding layers of tape in the basket. This eliminates the tugging and jerking of the tape normally encountered in baskets of previous designs. With the basket of the invention as shown, tape is not stretched, stressed, or strained; neither is it tightly folded or wrinkled. Thus it will be seen, that an improved tape basket structure has been provided.

What is claimed is:

1. An improved tape basket arrangement for storing in serpentine folds, the major portion of a traveling endless loop magnetic tape comprising:

a vertically extending upper storage portion,
an arcuately shaped intermediate storage portion,
means connecting said upper, central and lower storage portions so as to provide a continuous enclosure substantially L-shaped in appearance,
means providing an opening in the enclosure upper portion for receiving an incoming portion of said endless loop magnetic tape,
means providing an opening in said enclosure lower portion for the withdrawal of said magnetic tape, and
means for varying the width of said enclosure in accordance with the length of the endless loop tape portion to be stored therein.

2. An improved tape basket arrangement for storing in serpentine folds, the major portion of a traveling endless loop magnetic tape, comprising:

means including first and second side walls, an end wall, and front and back cover walls which cooperate to form a box-like enclosure constituting a storage chamber for the edgewise support of said magnetic tape,
said side, front and back walls being arcuately curved at an intermediate area lengthwise of said walls to provide an enclosure upper portion substantially vertically oriented and an enclosure lower portion substantially horizontally oriented,
said enclosure upper portion including an opening for receiving an incoming portion of said endless loop magnetic tape, and
said first side wall having an opening in its lower portion thereof adjacent said end wall to provide an exit for withdrawal of said portion of said endless loop magnetic tape.

3. An improved tape basket arrangement as defined in claim 2 wherein said second side wall is moveable relative to said first side wall for varying the width of said storage chamber in accordance with the requirements of the length of the endless loop tape portion to be stored therein.

4. An improved tape basket arrangement as defined in claim 2 and further including:

a third side wall substantially similar in shape to said first and second side walls, and
means mounting said third side wall within said enclosure and between said first and second side walls,
said means being adapted to allow for movement of said third side wall relative to said first side wall,
thereby to enable the width of the basket storage area to be adjusted to a desired dimension.

5. An improved tape basket arrangement as defined in claim 2 wherein said end wall is comprised of two lengthwise sections, one of which is separable from the other so as to provide an access to said enclosure lower portion for threading the tape through said exit opening in the lower portion of said first side wall.

6. An improved tape basket arrangement as defined in claim 2 wherein one of said cover walls is of a perforated material.

7. An improved tape basket arrangement for storing in serpentine folds, the major portion of a traveling endless tape, the combination comprising:

means including first and second parallel side walls, first and second parallel end walls, and parallel first and second cover walls which cooperate to form a box-like enclosure constituting a storage chamber for the edgewise support of said endless tape,
said first end wall having an opening therein forming an entrance for an incoming portion of said endless tape, said first side wall having an opening therein forming an exit for withdrawal of said portion of said endless tape, a third side wall positioned within said enclosure and parallel to said first and second side walls, and means for moving said third side wall relative to said first side wall for varying the width of said storage chamber defined by said first and third side walls in accordance with the requirements of the length of the endless tape portion to be stored therein.

said side walls and cover walls each including an arcuately curved intermediate portion so as to be L-shaped in their lengthwise directions wherein said side, end and cover walls cooperate to form an L-shaped storage chamber.

8. An improved tape basket arrangement as defined in claim 7 wherein said second end wall is comprised of two parallel lengthwise sections, one of which is separable from the other so as to provide an access to said enclosure lower portion for threading the tape through said exit opening in the lower portion of said side wall.

9. An improved tape basket arrangement as defined in claim 8 wherein one of said cover walls is of a perforated material.

References Cited

UNITED STATES PATENTS

| | | | |
|---|---|---|---|
| 2,397,762 | 4/1946 | Steele. | |
| 2,521,440 | 9/1950 | Bannon | 226—118 XR |
| 2,825,556 | 3/1958 | Rowe | 226—118 XR |
| 2,889,491 | 6/1959 | MacDonald | 226—118 XR |
| 3,420,425 | 1/1969 | Haddon et al. | 226—119 XR |

OTHER REFERENCES

Johnson, R. A.: IBM Technical Disclosure Bulletin, vol. 10, No. 9, February 1968.

ALLEN N. KNOWLES, Primary Examiner

U.S. Cl. X.R.

226—118